(12) United States Patent
Kakutani

(10) Patent No.: US 7,508,544 B2
(45) Date of Patent: Mar. 24, 2009

(54) EJECTION CONTROL OF QUALITY-ENHANCING INK

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 908 days.

(21) Appl. No.: 10/943,156

(22) Filed: Sep. 15, 2004

(65) Prior Publication Data

US 2007/0188528 A1 Aug. 16, 2007

(30) Foreign Application Priority Data

Sep. 17, 2003 (JP) ............................. 2003-324377

(51) Int. Cl.
*H04N 1/60* (2006.01)
*G06F 15/00* (2006.01)

(52) U.S. Cl. .................. 358/1.9; 358/518; 358/521

(58) Field of Classification Search .............. 358/1.1, 358/1.2, 1.6, 1.5, 1.7, 1.8, 1.9, 2.1, 2.99, 358/3.01, 3.02, 3.1, 3.11, 3.12, 1.11, 1.18, 358/518, 521, 3.13, 3.14, 3.15, 3.16, 3.19, 358/3.21, 3.22, 3.24, 3.27; 382/162, 163, 382/164, 165, 167; 347/183, 172, 188
See application file for complete search history.

(56) References Cited

U.S. PATENT DOCUMENTS 6,113,290 A * 9/2000 Tanaka et al. ................. 400/61
6,158,834 A * 12/2000 Kato et al. ..................... 347/9

FOREIGN PATENT DOCUMENTS

JP 2002-144551 5/2002

OTHER PUBLICATIONS

Abstract of Japanese Patent Publication No. 2002-144551, Pub. Date: May 21, 2002, Patent Abstracts of Japan.

* cited by examiner

*Primary Examiner*—Dov Popovici
(74) *Attorney, Agent, or Firm*—Martine Penilla & Gencarella, LLP

(57) ABSTRACT

This invention is a printing control apparatus for generating print data to be supplied to a print unit to print. The print unit is capable of forming dots on a print medium by ejecting at least one type of colored ink containing a color material and a quality-enhancing ink for enhancing quality of a printed material. The printing control apparatus includes an outline area extractor configured to extract an outline area of an image expressed by given image data and a dot data generator configured to generate colored dot data and transparent dot data according to the image data. The dot data generator is configured to reduce ink volume of dots formed in the outline area among the transparent dots.

9 Claims, 15 Drawing Sheets

Fig.9(a)
Colored ink volume data
(C, M, LC, LM, Y, K gradation values total)

|  | A | B | C | D | E | F | G | H |
|---|---|---|---|---|---|---|---|---|
| Raster 1 | 9 | 5 | 3 | 8 | 2 | 6 | 3 | 9 |
| Raster 2 | 8 | 3 | 5 | 0 | 9 | 8 | 5 | 6 |
| Raster 3 | 5 | 6 | 154 | 154 | 150 | 164 | 5 | 7 |
| Raster 4 | 5 | 7 | 154 | 146 | 155 | 167 | 4 | 1 |
| Raster 5 | 9 | 4 | 158 | 170 | 166 | 153 | 6 | 5 |
| Raster 6 | 4 | 8 | 167 | 155 | 166 | 154 | 5 | 8 |
| Raster 7 | 5 | 7 | 0 | 7 | 1 | 9 | 8 | 1 |
| Raster 8 | 9 | 5 | 0 | 1 | 2 | 6 | 6 | 4 |

Fig.9(b)
Quality-enhancing ink volume data (before processing)

|  | A | B | C | D | E | F | G | H |
|---|---|---|---|---|---|---|---|---|
| Raster 1 | 52 | 54 | 55 | 55 | 55 | 51 | 56 | 52 |
| Raster 2 | 53 | 56 | 55 | 55 | 60 | 52 | 58 | 55 |
| Raster 3 | 51 | 53 | 4 | 5 | 4 | 4 | 51 | 53 |
| Raster 4 | 51 | 57 | 4 | 4 | 5 | 5 | 53 | 59 |
| Raster 5 | 52 | 55 | 5 | 4 | 4 | 4 | 54 | 57 |
| Raster 6 | 57 | 50 | 4 | 3 | 3 | 5 | 58 | 54 |
| Raster 7 | 52 | 59 | 57 | 50 | 54 | 52 | 55 | 59 |
| Raster 8 | 55 | 52 | 58 | 53 | 54 | 59 | 59 | 58 |

Fig.10

Main scan direction (x)

Sub scan direction (y)

$$\Delta y = \begin{pmatrix} 1 & 1 & 1 \\ 1 & -8 & 1 \\ 1 & 1 & 1 \end{pmatrix}$$

Fig.11(a)

8 proximal Laplacian filters processing results (colored ink)

|          | A   | B   | C    | D    | E    | F    | G   | H   |
|----------|-----|-----|------|------|------|------|-----|-----|
| Raster 1 | 4   | -33 | -28  | -9   | -1   | -18  | -15 | 15  |
| Raster 2 | 14  | 157 | 286  | 479  | 398  | 296  | 90  | -32 |
| Raster 3 | -33 | 327 | -785 | -486 | -470 | -642 | 319 | 0   |
| Raster 4 | -34 | 480 | -533 | 139  | 19   | -463 | 436 | -36 |
| Raster 5 | -54 | 504 | -522 | -68  | -85  | -380 | 404 | 22  |
| Raster 6 | 23  | 292 | -761 | -367 | -389 | -659 | 250 | 1   |
| Raster 7 | -19 | 122 | 338  | 429  | 410  | 244  | 175 | -54 |
| Raster 8 | -44 | -39 | -38  | 9    | 10   | -56  | 8   | 7   |

Fig.11(b)

Binarization processing results (colored ink)

|          | A | B | C | D | E | F | G | H |
|----------|---|---|---|---|---|---|---|---|
| Raster 1 | 0 | 0 | 0 | 0 | 0 | 0 | 0 | 0 |
| Raster 2 | 0 | 1 | 1 | 1 | 1 | 1 | 1 | 0 |
| Raster 3 | 0 | 1 | 0 | 0 | 0 | 0 | 1 | 0 |
| Raster 4 | 0 | 1 | 0 | 0 | 0 | 0 | 1 | 0 |
| Raster 5 | 0 | 1 | 0 | 0 | 0 | 0 | 1 | 0 |
| Raster 6 | 0 | 1 | 0 | 0 | 0 | 0 | 1 | 0 |
| Raster 7 | 0 | 1 | 1 | 1 | 1 | 1 | 1 | 0 |
| Raster 8 | 0 | 0 | 0 | 0 | 0 | 0 | 0 | 0 |

Fig.12(a)

Colored ink volume data field

| Bit  | B7 | B6 | B5 | B4 | B3 | B2 | B1 | B0 |
|------|----|----|----|----|----|----|----|----|
| Data | 1  | 0  | 1  | 1  | 0  | 0  | 1  | 0  |

Fig.12(b)

Quality-enhancing ink volume data field

| Bit  | B7 | B6 | B5 | B4 | B3 | B2 | B1 | B0 |
|------|----|----|----|----|----|----|----|----|
| Data | 1  | 0  | 1  | 1  | 0  | 0  | 1  | 0  |

Flag — B7

Source ink volume storage field — B6–B0

Quality-enhancing ink volume data

Fig.13(a)

When forming transparent dots

| Bit  | B7 | B6 | B5 | B4 | B3 | B2 | B1 | B0 |
|------|----|----|----|----|----|----|----|----|
| Data | 0  | 0  | 1  | 1  | 0  | 1  | 1  | 0  |

Flag     Source ink volume storage field

Fig.13(b)

When not forming transparent dots

| Bit  | B7 | B6 | B5 | B4 | B3 | B2 | B1 | B0 |
|------|----|----|----|----|----|----|----|----|
| Data | 1  | 0  | 1  | 1  | 0  | 1  | 1  | 0  |

Flag     Source ink volume storage field

Fig.14(a)
Colored ink volume data (C, M, LC, LM, Y, K gradation values total)

|  | A | B | C | D | E | F | G | H |
|---|---|---|---|---|---|---|---|---|
| Raster 1 | 9 | 5 | 3 | 8 | 2 | 6 | 3 | 9 |
| Raster 2 | 8 | 3 | 5 | 0 | 9 | 8 | 5 | 6 |
| Raster 3 | 5 | 6 | 154 | 154 | 150 | 164 | 5 | 7 |
| Raster 4 | 5 | 7 | 154 | 146 | 155 | 167 | 4 | 1 |
| Raster 5 | 9 | 4 | 158 | 170 | 166 | 153 | 6 | 5 |
| Raster 6 | 4 | 8 | 167 | 155 | 166 | 154 | 5 | 8 |
| Raster 7 | 5 | 7 | 0 | 7 | 1 | 9 | 8 | 1 |
| Raster 8 | 9 | 5 | 0 | 1 | 2 | 6 | 6 | 4 |

Fig.14(b)
Quality-enhancing ink volume data (after processing)

|  | A | B | C | D | E | F | G | H |
|---|---|---|---|---|---|---|---|---|
| Raster 1 | 52 | 54 | 55 | 55 | 55 | 51 | 56 | 52 |
| Raster 2 | 53 | 0 | 0 | 0 | 0 | 0 | 0 | 55 |
| Raster 3 | 51 | 0 | 4 | 5 | 4 | 4 | 0 | 53 |
| Raster 4 | 51 | 0 | 4 | 4 | 5 | 5 | 0 | 59 |
| Raster 5 | 52 | 0 | 5 | 4 | 4 | 4 | 0 | 57 |
| Raster 6 | 57 | 0 | 4 | 3 | 3 | 5 | 0 | 54 |
| Raster 7 | 52 | 0 | 0 | 0 | 0 | 0 | 0 | 59 |
| Raster 8 | 55 | 52 | 58 | 53 | 54 | 59 | 59 | 58 |

Modification

Fig.15(a)

8 proximal Laplacian filters processing results (colored ink)

|  | A | B | C | D | E | F | G | H |
|---|---|---|---|---|---|---|---|---|
| Raster 1 | 4 | -33 | -28 | -9 | -1 | -18 | -15 | 15 |
| Raster 2 | 14 | 157 | 286 | 479 | 398 | 296 | 90 | -32 |
| Raster 3 | -33 | 327 | -785 | -486 | -470 | -642 | 319 | 0 |
| Raster 4 | -34 | 480 | -533 | 139 | 19 | -463 | 463 | -36 |
| Raster 5 | -54 | 504 | -522 | -68 | -85 | -380 | 404 | 22 |
| Raster 6 | 23 | 292 | -761 | -367 | -389 | -659 | 250 | 1 |
| Raster 7 | -19 | 122 | 338 | 429 | 410 | 244 | 175 | -54 |
| Raster 8 | -44 | -39 | -38 | 9 | 10 | -56 | 8 | 7 |

Fig.15(b)

Binarization processing results (colored ink)

|  | A | B | C | D | E | F | G | H |
|---|---|---|---|---|---|---|---|---|
| Raster 1 | 0 | 0 | 0 | 0 | 0 | 0 | 0 | 0 |
| Raster 2 | 0 | 0 | 0 | 0 | 0 | 0 | 0 | 0 |
| Raster 3 | 0 | 0 | 1 | 1 | 1 | 1 | 0 | 0 |
| Raster 4 | 0 | 0 | 1 | 0 | 0 | 1 | 0 | 0 |
| Raster 5 | 0 | 0 | 1 | 0 | 0 | 1 | 0 | 0 |
| Raster 6 | 0 | 0 | 1 | 1 | 1 | 1 | 0 | 0 |
| Raster 7 | 0 | 0 | 0 | 0 | 0 | 0 | 0 | 0 |
| Raster 8 | 0 | 0 | 0 | 0 | 0 | 0 | 0 | 0 |

EJECTION CONTROL OF QUALITY-ENHANCING INK

BACKGROUND OF THE INVENTION

1. Field of the Invention

The present invention relates to gradation-reduction processing technology for reducing the number of gradations for image data, and particularly relates to reducing the number of gradations for the ink volume to improve the quality of printed matter.

2. Description of the Related Art

In recent years, as computer output devices, printers that eject ink from nozzles of a printing head are becoming very popular. For example, as disclosed in Unexamined Patent No. 2002-144551, by using quality-enhancing ink for improving the quality of printed matter, there is an attempt to improve quality of printed matter by improving coloring, moisture resistance, and light resistance, and suppressing glossiness. This kind of quality-enhancing ink is an almost transparent ink to try to achieve higher quality printed matter, so there are cases when this is ejected onto pixels for which colored ink for coloring does not land (hereafter called white pixels).

However, when quality-enhancing ink is ejected onto white pixels adjacent to pixels on which colored ink is ejected, there are cases when a bleeding phenomenon occurs for which colored ink is pulled to the white pixels due to the surface tension of the quality-enhancing ink. The bleeding phenomenon is a cause of blurring, so it caused the problem of greatly degrading the image quality. Note that this kind of problem was a problem that occurred when quality-enhancing ink was ejected near the outline part of a broad printing image.

SUMMARY OF THE INVENTION

The present invention was created to solve the problems described above for the prior art, and its purpose is to provide a technology that suppresses blurring at the outline part for printing using quality-enhancing ink for improving the quality of printed matter.

In order to attain the above and the other objects of the present invention, there is provided a printing control method of generating print data to be supplied to a print unit to print. The printing control method comprises (a) an outline area extraction step of extracting an outline area of an image expressed by given image data; and (b) a dot data generating step of generating colored dot data and transparent dot data according to the image data, the colored dot data expressing formation status of colored dots formed with the colored ink on each pixel, the transparent dot data expressing formation status of transparent dots formed with the quality-enhancing ink on each pixel. The dot data generating step includes an ink volume reduction step of reducing ink volume of dots formed in the outline area among the transparent dots.

With the printing control method of the present invention, the transparent dot ink volume formed on the outline area is reduced, so it is possible to suppress the blurring caused by ejection of colored ink on the quality-enhancing ink that is ejected on the outline area.

Note that the present invention can be realized in various formats such as a printing device, a computer program that expresses the methods thereof or the function of the device on a computer, a recording medium on which that computer program is recorded, data signals implemented within a carrier wave that includes the computer program, or a computer program product, etc.

BRIEF DESCRIPTION OF THE DRAWINGS

FIGS. 9(a) and 9(b) are explanatory diagrams that show an example of the ink volume data of colored ink that has an outline area and the ink volume data of quality-enhancing ink.

FIG. 10 shows 8 proximal Laplacian filters used for the outline area extraction process of a working example of the present invention.

FIGS. 11(a) and 11(b) are explanatory diagrams that show the situation of filter processing and binarization processing being performed on the ink volume data of colored ink.

FIGS. 12(a) and 12(b) are explanatory diagrams that show the data field of the ink volume data of colored ink and quality-enhancing ink for a working example of the present invention.

FIGS. 13(a) and 13(b) are explanatory diagrams that show the data of ink volume data of quality-enhancing ink for a working example of the present invention.

FIGS. 14(a) and 14(b) are explanatory diagrams that show ink volume data of colored ink and ink volume data of quality-enhancing ink after processing.

FIGS. 15(a) and 15(b) are explanatory diagrams that show the situation of filter processing and binarization processing being performed on the ink volume data of colored ink for a variation example.

DESCRIPTION OF PREFERRED EMBODIMENTS

Figure 1:
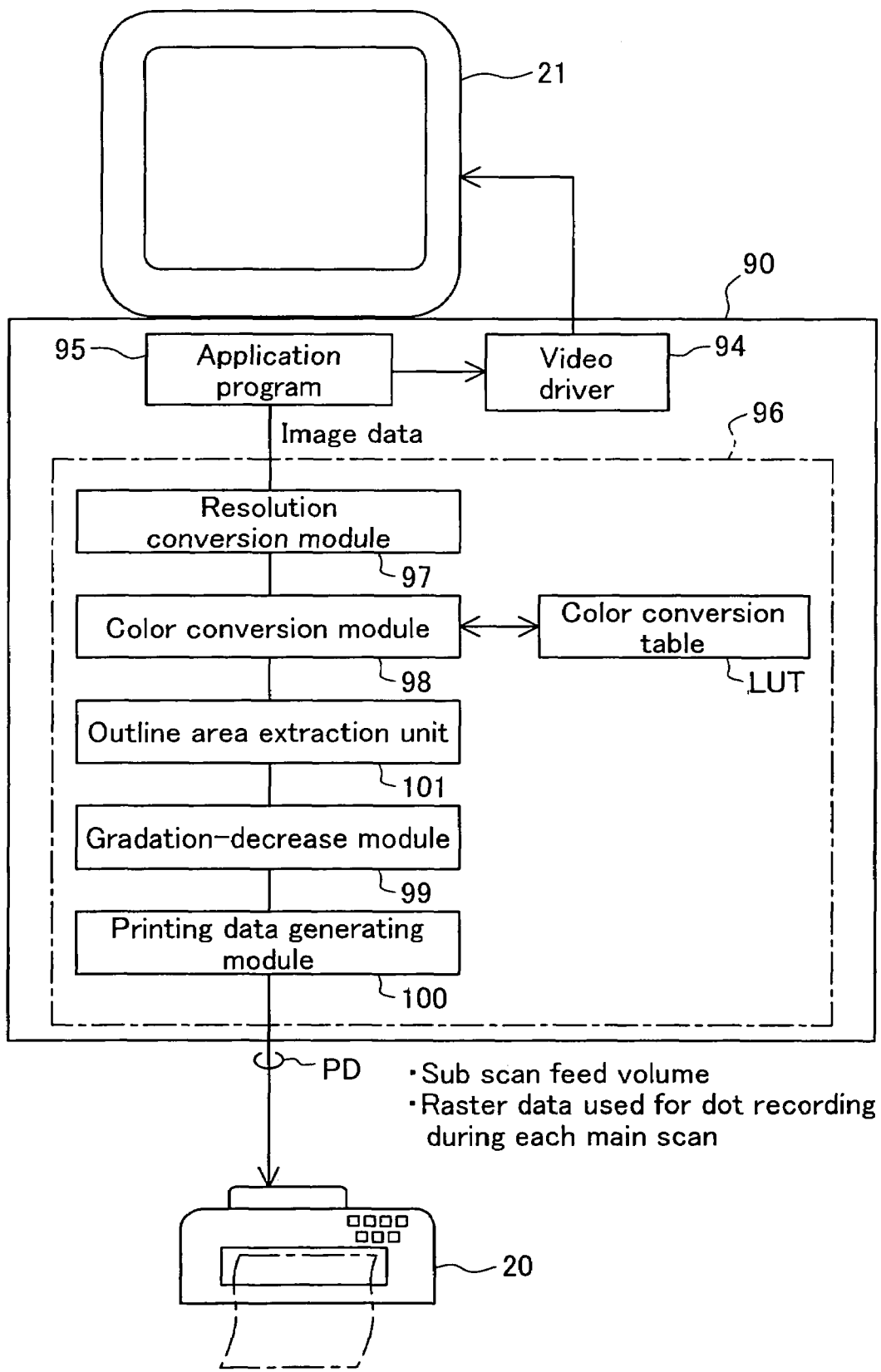
FIG. 1 is a block diagram that shows the structure of the printing system as a working example of the present invention.

A. Apparatus Structure:

FIG. 1 is a block diagram that shows the structure of a printing system as an embodiment of the present invention. This printing system has a computer 90 as a printing control apparatus, and a color printer 20 as a printing unit. The combination of color printer 20 and computer 90 can be called a "printing apparatus" in its broad definition.

Application program 95 operates on computer 90 under a specific operating system. Video driver 91 and printer driver 96 are incorporated in the operating system, and print data PD to be sent to color printer 20 is output via these drivers from application program 95. Application program 95 performs the desired processing on the image to be processed, and displays the image on CRT 21 with the aid of video driver 91.

When application program 95 issues a print command, printer driver 96 of computer 90 receives image data from application program 95, and converts this to print data PD to supply to color printer 20. In the example shown in FIG. 1, printer driver 96 includes resolution conversion module 97, color conversion module 98, an outline area extraction unit 101, a gradation-reduction module 99, a print data generation module 100, and color conversion table LUT.

Resolution conversion module 97 has the role of converting the resolution (in other words, the pixel count per unit length) of the color image data handled by application program 95 to resolution that can be handled by printer driver 96. Image data that has undergone resolution conversion in this way is still image information made from the three colors RGB. Color conversion module 98 converts RGB image data to multi-tone data of multiple ink colors that can be used by color printer 20 for each pixel while referencing color conversion table LUT.

The color converted multi-tone data can have a tone value of 256 levels, for example. The gradation-reduction module 99 executes halftone processing to express this tone value on color printer 20 by distributing and forming ink dots. Image data that has undergone halftone processing is realigned in the data sequence in which it should be sent to color printer 20 by the print data generation module 100, and ultimately is output as print data PD. Print data PD includes raster data that shows the dot recording state during each main scan and data that shows the sub-scan feed amount. The function of the outline area extraction unit 101 is described later.

Printer driver 96 is a program for realizing a function that generates print data PD. A program for realizing the functions of printer driver 96 is supplied in a format recorded on a recording medium that can be read by a computer. As this kind of recording medium, any variety of computer readable medium can be used, including floppy disks, CD-ROMs, opt-magnetic disks, IC cards, ROM cartridges, punch cards, printed items on which a code such a bar code is printed, a computer internal memory device (memory such as RAM or ROM), or external memory device, etc.

Figure 2:
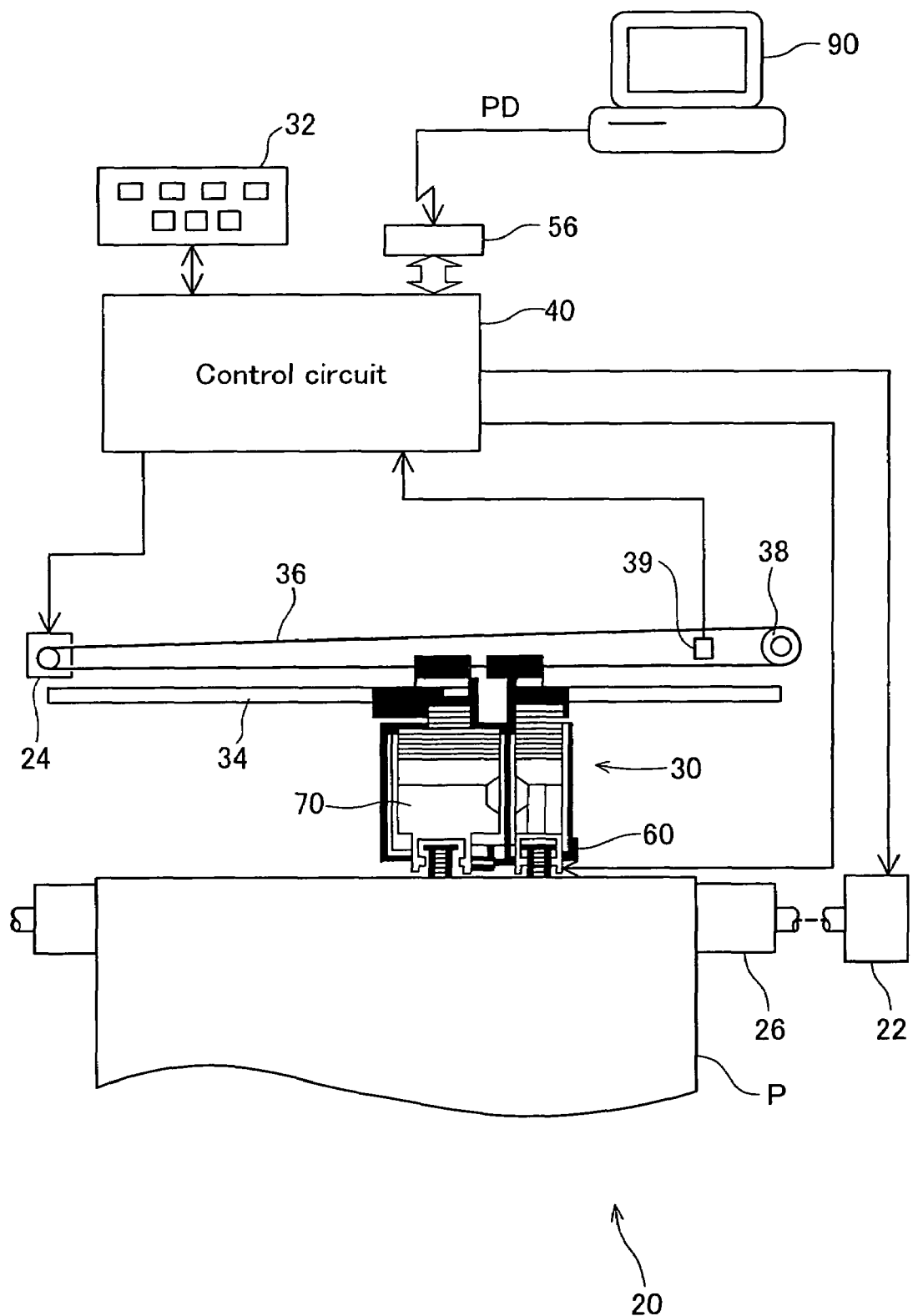
FIG. 2 is a schematic structural diagram of the color printer 20.

FIG. 2 is a schematic structural diagram of color printer 20. Color printer 20 is equipped with a sub-scan feed mechanism that carries printing paper P in the sub-scanning direction using paper feed motor 22, a main scan feed mechanism that sends cartridge 30 back and forth in the axial direction of platen 26 using carriage motor 24, a head driving mechanism that drives printing head unit 60 built into carriage 30 and controls ink ejecting and dot formation, and control circuit 40 that controls the interaction between the signals of paper feed motor 22, carriage motor 24, printing head unit 60, and operating panel 32. Control circuit 40 is connected to computer 90 via connector 56.

Figure 3:
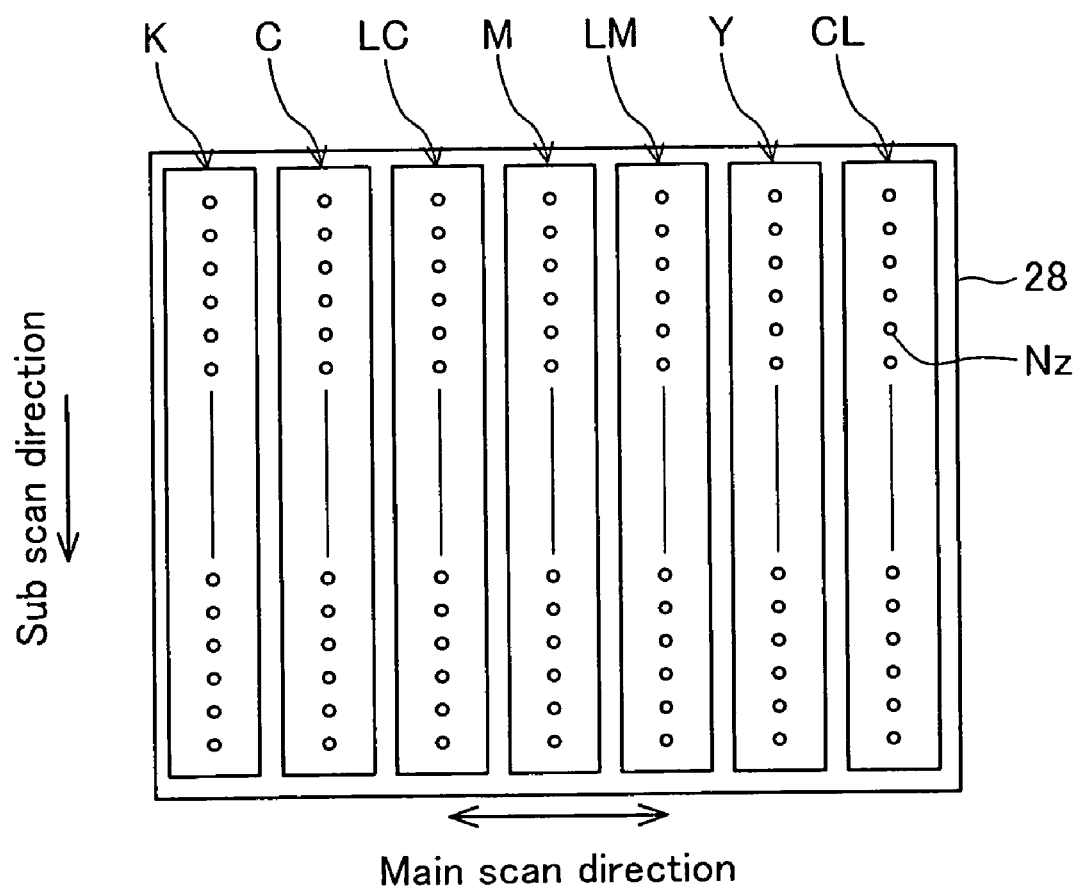
FIG. 3 is an explanatory diagram that shows the arrangement of nozzles N2 on the bottom surface of the printing head 28.

FIG. 3 shows an arrangement of nozzles on a bottom face of a print head 28. Nozzle arrays for ejecting color inks containing color material and transparent quality-enhancing ink CL are formed on the bottom face of the print head 28. The structure of the embodiment uses black ink K, cyan ink C, light cyan ink LC, magenta ink M, light magenta ink LM, and yellow ink Y as the color inks.

The color inks are, however, not restricted to these six inks K, C, LC, M, LM, and Y, but may be specified arbitrarily according to the desired quality of printing images. For example, four inks K, C, M, and Y may be available. In another example, only black ink K may be used as the color ink. Dark yellow ink having lower lightness than that of the yellow ink Y, gray ink having higher lightness than that of the black ink K, blue ink, red ink, and green ink may be used additionally in any combination.

The quality-enhancing ink CL may be transparent and colorless ink that has the equivalent gloss to those of the other inks and improves the color development properties of the other inks. One typical example of the quality-enhancing ink CL is one of inks disclosed in Japanese Patent Laid-Open Gazette No. Hei 8-60059. The quality-enhancing ink restrains a variation in gloss and improves the color development properties, thus ensuring the high quality of printed images. Application of water resistance-enhancing and light stability-enhancing ink to the quality-enhancing ink CL effectively improves the water resistance and the light stability of printed images.

The color printer 20 having the hardware configuration described above actuates the piezoelectric elements of the print head 28, simultaneously with a feed of printing paper P by means of the paper feed motor 22 and reciprocating movements of the carriage 30 by means of the carriage motor 24. Ink droplets of respective colors are thus ejected to form large-size, medium-size, and small-size ink dots and form a multi-color, multi-tone image on the printing paper P.

Figure 4:
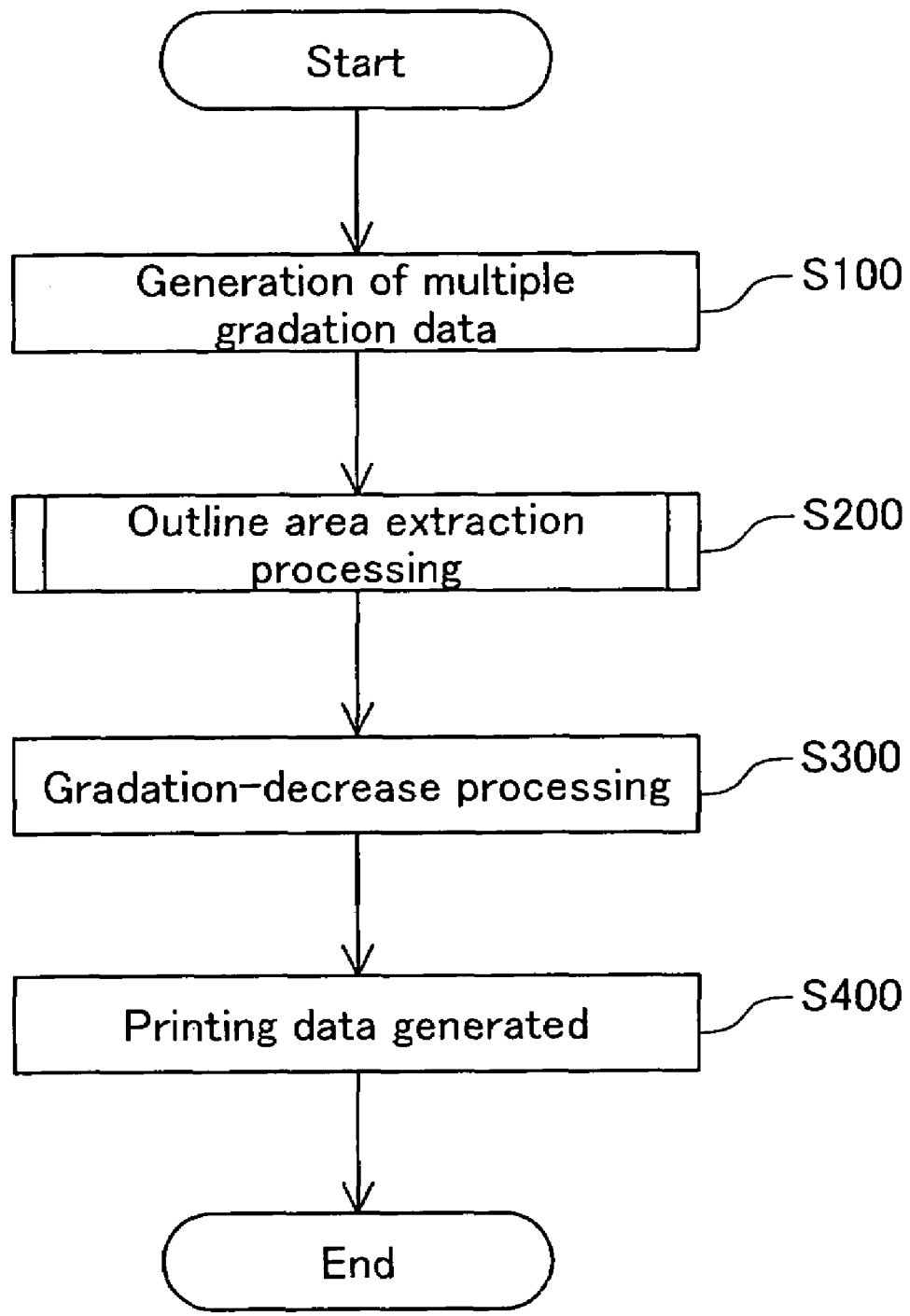
FIG. 4 is a flow chart that shows the printing data generating processing routine for a working example of the present invention.

B. Printing Data Generating Process for a Working Example of the Present Invention FIG. 4 is a flow chart that shows the printing data generating processing routine of a working example of the present invention. The printing data generating process is a process that is performed by the computer 90 to generate the printing data PD to be supplied to the color printer 20.

At step S110, the computer 90's (FIG. 1) resolution conversion module 97 and color conversion module 98 generate multiple gradation data as described above from the given RGB image data.

Figure 5:
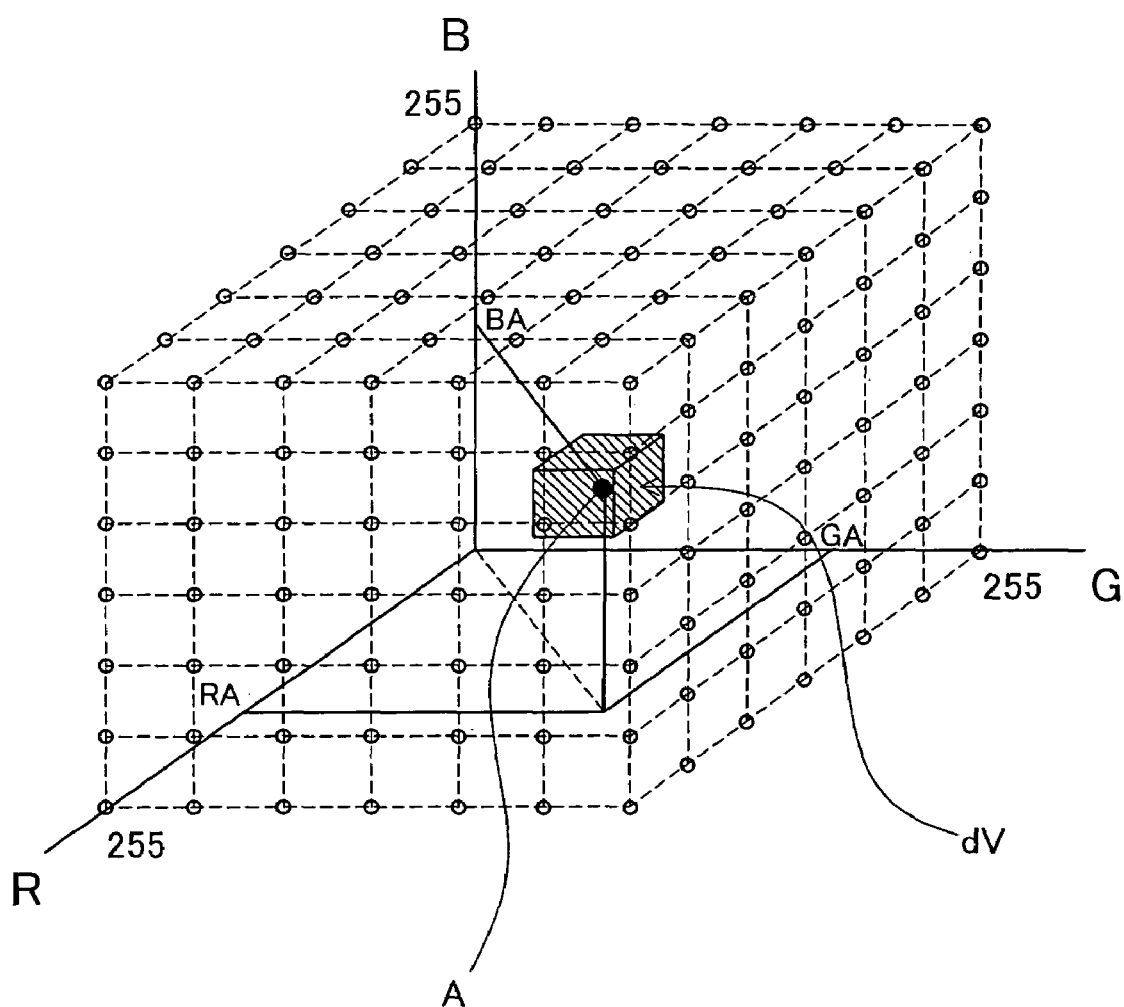
FIG. 5 is an explanatory diagram that shows the color conversion table LUT that is used with the color conversion process for a working example of the present invention.

FIG. 5 is an explanatory diagram that shows the color conversion table LUT that is used for color conversion processing with a working example of the present invention. With the color conversion table LUT, the gradation values of each of the colors RGB are captured in three mutually intersecting axes, and space defined by these three axes are subdivided into a grid form. At each subdivided grid point is stored the gradation value of each ink for expressing in colored inks and quality-enhancing inks the colors shown by the gradation values of each of the colors RGB.

The color conversion module 98 performs color conversion while referencing the color conversion table LUT. For example, when each gradation value of the image data R, G, and B are respectively RA, GA, and BA, first, a search is done for a cube dV such as one that includes point A expressed by coordinates (RA, GA, BA) on the color conversion table LUT. The cube dV is a cube that has as its vertex eight grid points selected so as to include point A.

The color conversion module 98 reads the colored ink (C, M, Y, K, LC, and LM) and quality-enhancing ink CL gradation values stored at these eight grid points.

Figure 6A:
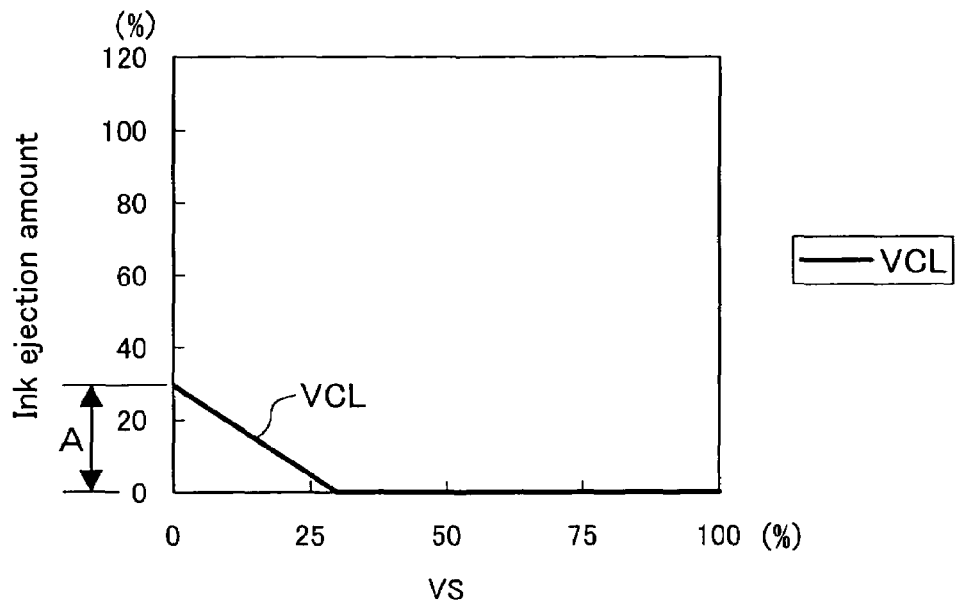
FIGS. 6(a) and 6(b) are graphs that show an example of the relationship between the ejection volume of colored ink and the ejection volume of quality-enhancing ink.
Figure 6B:
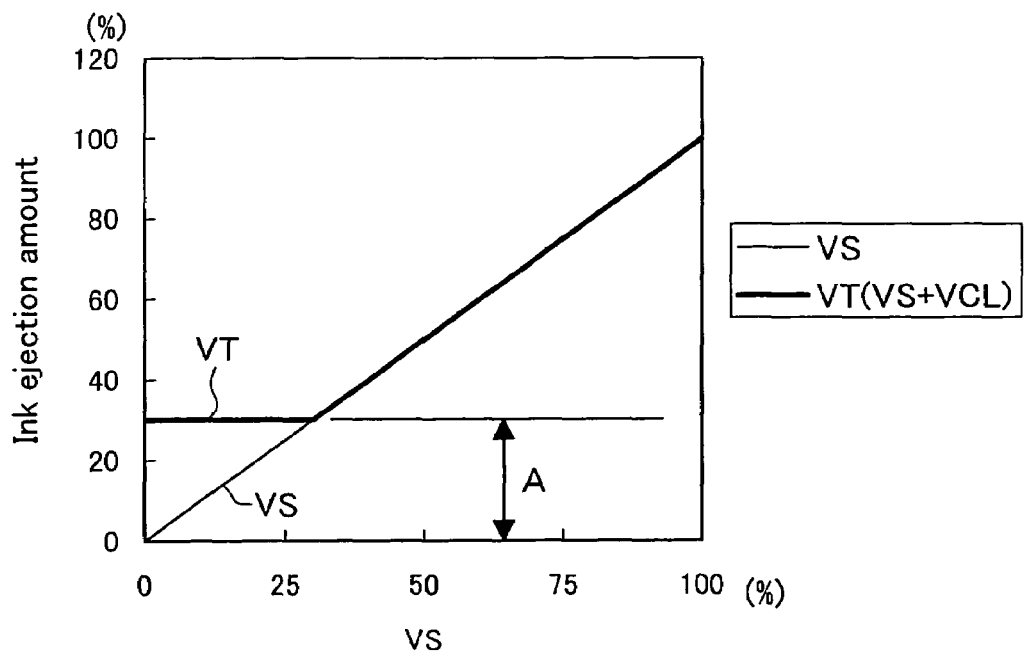

FIGS. 6(a) and 6(b) are graphs that show an example of the relationship between the ejection volume of colored ink and the ejection volume of quality-enhancing ink. FIG. 6(a) shows the relationship between the colored ink ejection volume VS and the quality-enhancing ink ejection volume VCL. FIG. 6(b) shows the relationship between the colored ink ejection volume VS and the total vale of the colored ink and quality-enhancing ink ejection volume VT (=VS+VCL). The horizontal axis is the colored ink ejection volume VS, and the vertical axis is the ink ejection volume shown with the explanatory note.

As can be seen from FIGS. 6(a) and 6(b), when the printing medium is glossy paper, for example, the quality-enhancing ink ejection volume is determined such that a large volume of quality-enhancing ink is ejected on the blank area for which colored ink is not ejected. The reason for this determination is that when printing on a printing medium that has a relatively strong glossiness, there is a tendency for the glossiness to be stronger in areas that have large volumes of colored ink ejected, so if a greater volume of quality-enhancing ink is ejected at white pixels where dots are not formed, it is possible to suppress gloss unevenness. In this way, with this working example, there is a negative correlation between the quality-enhancing ink and the colored ink ejection volume for each pixel.

Figure 7A:
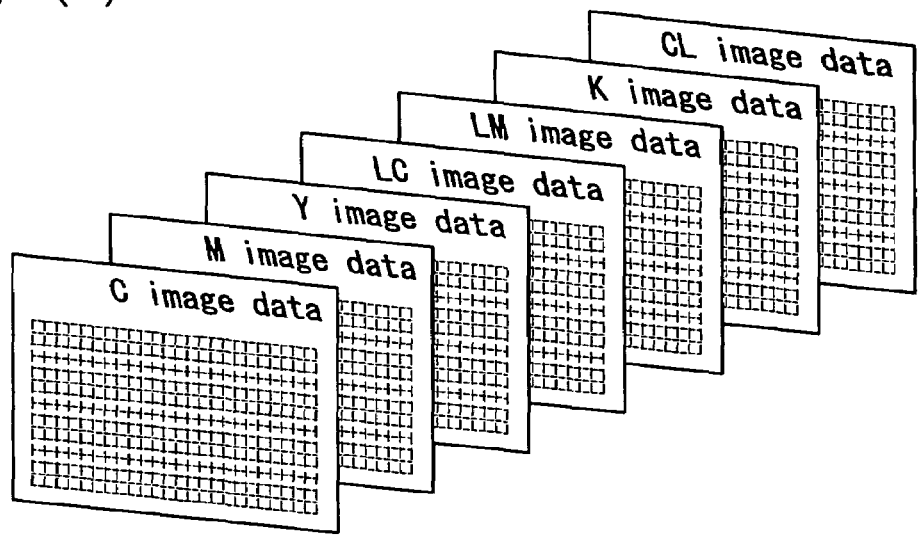
FIGS. 7(a) and 7(b) are explanatory diagrams that show the contents of generated multiple gradation data.
Figure 7B:
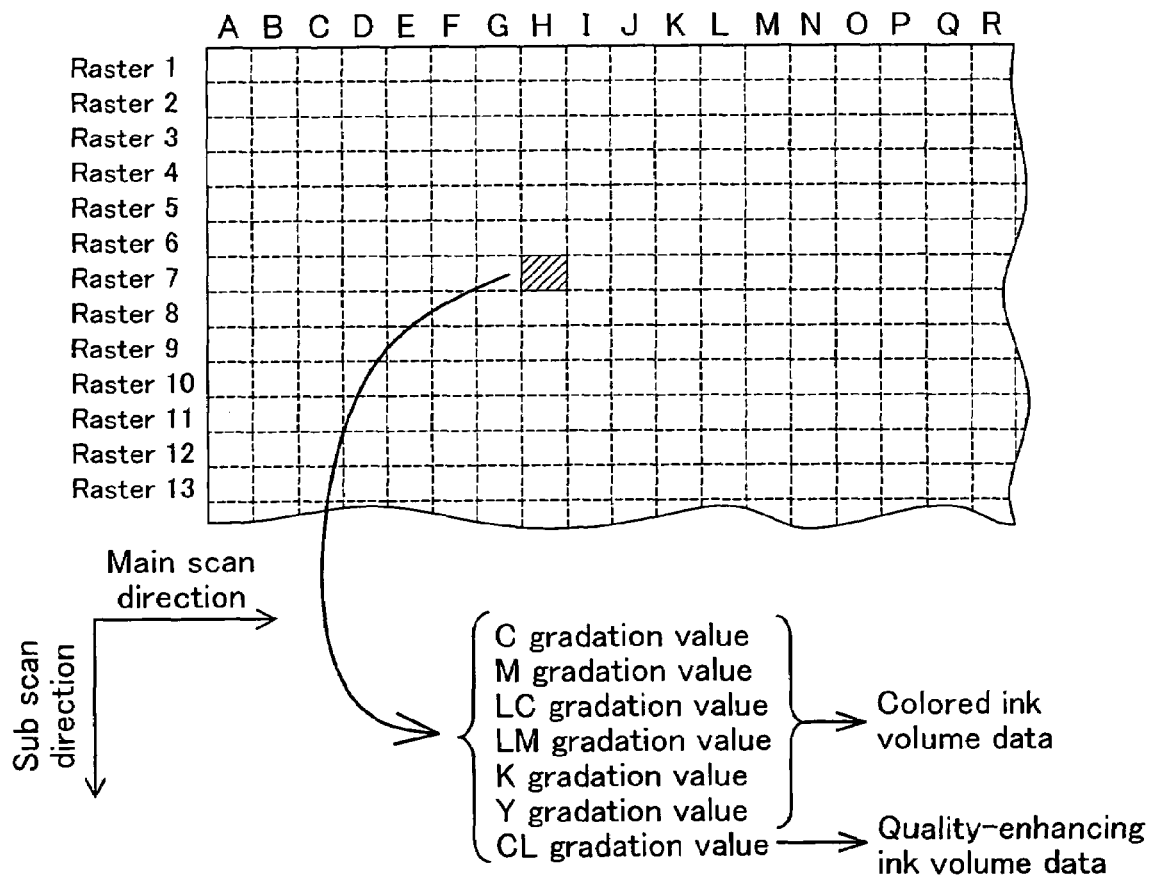

FIGS. 7(a) and 7(b) are explanatory diagrams that show the contents of the generated multiple gradation data. The multiple gradation data includes multiple gradation data for the six colored inks C, M, LC, LM, K, and Y, and multiple gradation data for the quality-enhancing ink CL (FIG. 7(a)).

At step S200, the outline area extraction unit 101 (FIG. 1) extracts the outline area of an image. With this working example, extraction of the outline area is performed based on the colored ink ejection volume. The reason this is performed based on the colored ink ejection volume is because it is easy for bleeding of the colored ink to occur on the quality-enhancing ink when there is a sudden change in colored ink ejection volume.

Figure 8:
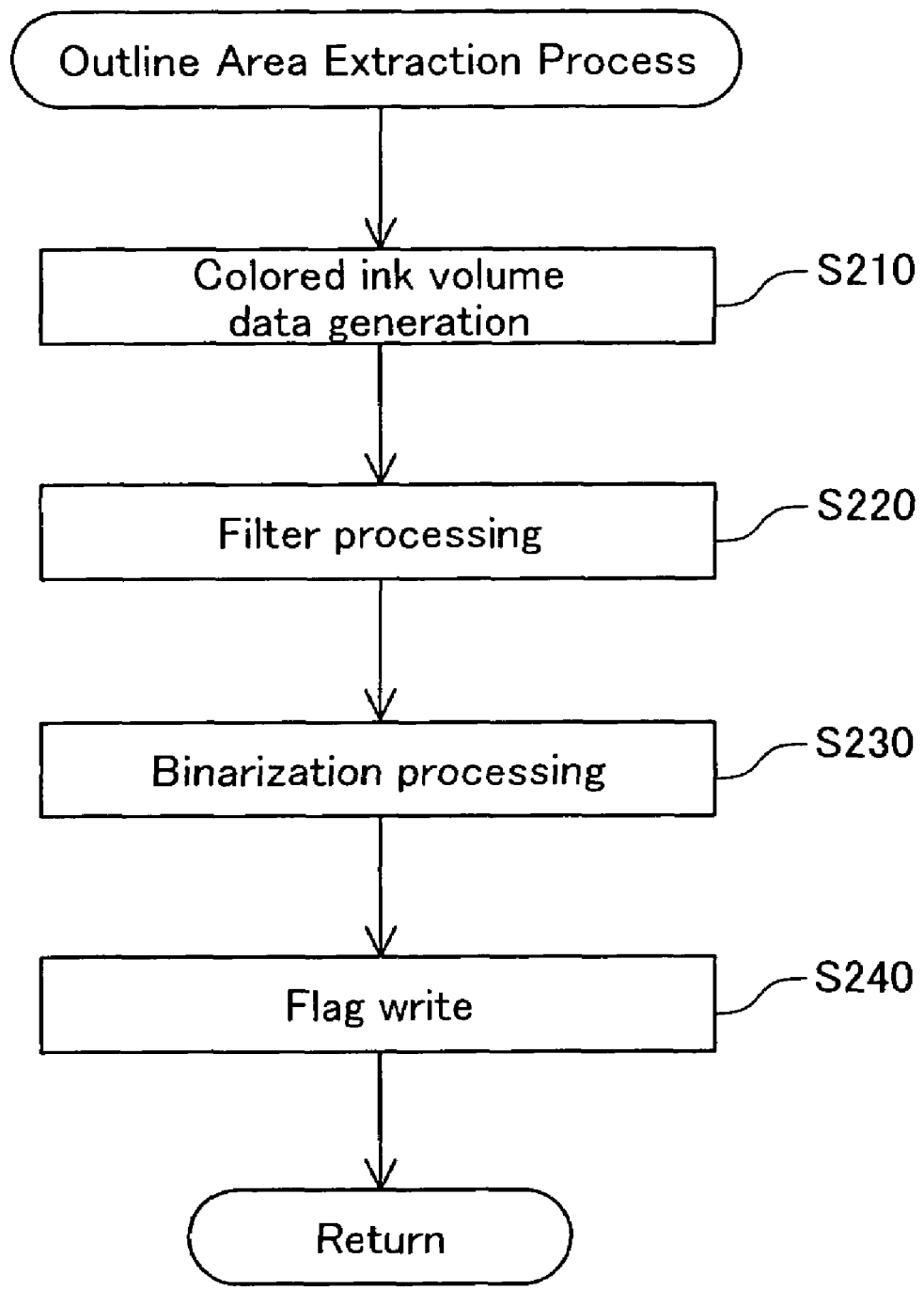
FIG. 8 is a flow chart that shows the flow of an outline area extraction processing routine for a working example of the present invention.

FIG. 8 is a flow chart that shows the outline area extraction processing routine of a working example of the present invention. At step S210, the outline area extraction unit 101 generates colored ink volume data. The colored ink volume data is data that is generated by totaling each of the pixel values of the multiple gradation data of the six colored inks C, M, LC, LM, K, and Y.

FIGS. 9(a) and 9(b) are explanatory diagrams that show examples of the ink volume data of colored ink that has an outline area and the ink volume data of quality-enhancing ink. FIG. 9(a) shows an example of ink volume data of colored ink that has an outline area. FIG. 9(b) shows an example of ink volume data before processing of quality-enhancing ink.

As can be seen from FIGS. 9(a) and 9(b), with this example, with the dotted line as a border, there is a sudden change in the colored ink ejection volume and the quality-enhancing ink ejection volume. Specifically, for colored inks, a relatively large amount is ejected in the area inside the dotted lines, and a relatively small amount is ejected in the area outside the dotted line. Meanwhile, the reverse relationship exists for the quality-enhancing ink. The reason there is a reverse relationship is because there is a negative correlation for the colored ink ejection volume and quality-enhancing ink ejection volume for each pixel (FIGS. 6(a) and 6(b)).

At step S220, the outline area extraction unit 101 performs filter processing. With this working example, filter processing is performed using 8 proximal Laplacian filters (FIG. 10) which compose one outline line extraction filter.

FIGS. 11(a) and 11(b) are explanatory diagrams that show the situation of filter processing and binarization processing being performed on ink volume data of colored ink. FIG. 11(a) shows the results of filter processing being performed on the ink volume data of the colored ink. As we can see from FIG. 11(a), as a result of filter processing, the pixel value of pixels in contact with the outside of the dotted line are very big. With this working example, the occurrence of blurriness is suppressed by reducing the ejection volume of quality-enhancing ink that is ejected onto these pixels. The main cause of the occurrence of blurriness for which the cause is ejection of quality-enhancing ink is the pulling of colored ink to the quality-enhancing ink that is ejected on to pixels adjacent to pixels on which a large volume of colored ink is ejected.

At step S230, the outline area extraction unit 101 performs binarization processing. In specific terms, with a preset threshold value as a reference, pixel values are determined to be "0" or "1" according to whether they are larger than this threshold value or not. When the pixel value is "1," that pixel belongs to the outline area, and when the pixel value is "0," that pixel is shown not to belong to that outline area.

FIG. 11(b) shows the results of performing binarization with the threshold value as "100." As can be seen from FIG. 11(b), the pixel value of the pixels in contact outside the dotted line are all "1," and the pixel values of the other pixels are all "0."

At step S240, the outline area extraction unit 101 performs flag write. Flag write is performed by a flag being raised for the ink volume data of pixels (pixels with a pixel value of "1") that belong to the outline area.

FIGS. 12(a) and 12(b) are explanatory diagrams that show the data field of the ink volume data of colored ink and quality-enhancing ink for a working example of the present invention. FIG. 12(a) shows the data field of ink volume data of colored ink. FIG. 12(b) shows the data field of ink volume data of quality-enhancing ink.

The data field of the ink volume data of colored ink is formed from 8 bits of ink volume storage fields bits B0 to B7. This data is able to express the ink volume of colored ink ejected on each pixel as 256 gradations.

The data field of the ink volume data of quality-enhancing ink is formed from bit B7 for the flag and source ink volume storage fields B0 to B6. The flag bit B7 is a bit for showing whether or not a pixel belongs to an outline. The source ink volume storage fields B0 to B6 can show the ink volume of quality-enhancing ink in 128 gradations.

With this working example, as shown in FIGS. 6(a) and 6(b), the reason that the ink volume of quality-enhancing ink is shown by 128 gradations is because since the maximum ejection volume to each pixel of quality-enhancing ink is half or less of the colored ink, it is possible to show up to a maximum ejection volume on each pixel of quality-enhancing ink using 128 gradations.

Note that when the maximum ejection volume of quality-enhancing ink to each pixel is not half or less of the colored ink, it is possible to create surplus bits by roughening the quantization level, for example. Since the quality-enhancing ink is almost transparent, even if the quantization level is roughened, there is no excessive degradation of the image quality.

FIGS. 13(a) and 13(b) are explanatory diagrams that show the data of ink volume data for quality-enhancing ink for a working example of the present invention. FIGS. 13(a) and 13(b) respectively show data when transparent dots are formed and when they are not formed. These data are generated by raising a flag (bit B7) of pixels that belong to the outline area based on the pixel values of FIG. 11(b).

FIGS. 14(a) and 14(b) are explanatory diagrams that show the ink volume data of the colored ink and the ink volume data of the quality-enhancing ink after processing. FIG. 14(a) shows the same data as that in FIG. 9(a). FIG. 14(b) shows the ink volume data of the quality-enhancing ink after processing.

As can be seen from FIG. 14(b), the ejection volume of quality-enhancing ink for pixels in contact with the outside of the dotted line are all zero. By doing this, it is possible to suppress the pulling of colored ink to quality-enhancing ink ejected in the outline area that is in contact with the outside of the dotted line.

Multiple gradation data generated in this way is output to the color printer 20 as printing data PD via gradation-reduction processing (step S300) by the gradation-reduction module 99 and printing data processing (step S400) by the printing data generating module 100.

In this way, with this working example, by having the gradation value of the quality-enhancing ink to the outline area be zero, it is possible to suppress the pulling of colored ink to the quality-enhancing ink ejected onto the outline area, so it is possible to suppress blurring in the outline part which is caused by ejection of quality-enhancing ink.

C. Variation Examples:

Note that the present invention is not limited to the aforementioned working examples and embodiments, and it is possible to implement this in various formats in a scope that does not stray from the key points, and the following kinds of variations are possible, for example.

C-1. With the working examples described above, the gradation value of the quality-enhancing ink to pixels that belong to the outline area is zero, but it is also possible to structure this so that the gradation value of the quality-enhancing ink is reduced to a specified value, for example. The reduction volume of the gradation value of the quality-enhancing ink is preferably determined according to the printing environment which means the type of printing medium and the characteristics of the quality-enhancing ink and the colored ink.

Furthermore, for the quality-enhancing ink reduction, rather than having an adjustment of the gradation value such as that performed in the working example noted above, it is also possible to structure this such that this is performed by excessive gradation-reduction processing. This kind of reduction can be realized by various methods like prohibiting the formation of dots or culling dots in the outline area, for example, or by changing the dot sizes (making them smaller). Generally, the dot data generating unit used with the present invention may be structured so that for any of the transparent dot data generating processes that show the formation status for each pixel of the transparent dots, the ink volume of the transparent dots formed in the outline area is reduced.

C-2. With the working example described above, the outline area is extracted using multiple gradation data, but, for example, it is also possible to extract the outline area according to the RGB pixel data and Lab pixel data pixel values. Generally, the outline area extraction unit used with the present invention may be structured so that the outline area of the image expressed by the given image data is extracted.

When extracting an outline area according to the pixel value of the RGB image data, it is possible to reduce the quality-enhancing ink volume only when a white pixel is shown, specifically, when each value of RGB shows a maximum gradation value. By doing this, filter processing may be performed only for white pixels for which the quality-enhancing ink volume reduction effect is large, so it is possible to increase processing speed.

When extracting an outline area according to the Lab image data pixel value, it is preferable to do extraction of the outline area based only on the L value that shows brightness. This is because it is possible to make the processing speed faster if the outline area is extracted based only on the L value. Note that the L value is an element for which the visibility is greater than the two other elements that show brightness. Because of this, even when the other two elements are disregarded, there is no excessive degradation of the outline area extraction capability.

C-3. With the working example described above, 8 proximal Laplacian filters are used for outline area extraction, but it is also possible to use a filter which is capable of outline line extraction such as 4 proximal Laplacian filters, a Sobel filter, or a differential filter, for example.

C-4. With the working example described above, the quality-enhancing ink and colored ink ejection volume for each pixel have a negative correlation, but it is also possible to use the present invention in cases such as when the quality-enhancing ink and colored ink ejection volume for each pixel have a positive correlation, for example.

In a case such as when the quality-enhancing ink and colored ink ejection volume have a positive correlation, there are cases when printing is done on plain paper or some other printing medium which has relatively low gloss, for example. In this case, by having the quality-enhancing ink and colored ink land overlapping, the excessive ink absorption that occurs with plain paper is suppressed, and by doing this, it is possible to suppress coloring unevenness of colored ink.

However, when the quality-enhancing ink and colored ink ejection volume have a positive correlation, it is preferable to have the structure so that different pixels from the pixels in the working example noted above (FIGS. 11(a) and 11(b)) are extracted as the outline area. Specifically, it is preferable to have pixels in contact outside the dotted line as shown in FIGS. 15(a) and 15(b) (pixels on the side for which the colored ink ejection volume is high) extracted.

The reason that the pixels on the side for which colored ink ejection volume is high are extracted is because the quality-enhancing ink and colored ink ejection volume have a positive correlation, so the quality-enhancing ink ejection is high at the pixels on the side for which the colored ink ejection volume is high. The main cause of blurring in this kind of case is pooling of ink noted using quality-enhancing ink and colored ink or errors in the quality-enhancing ink ejection position. Note that extraction of pixels such as that shown in FIGS. 15(a) and 15(b) can be realized with, for example, a threshold value of "−100," having pixels belong to the outline area when the pixel value is smaller than that, and performing binarization processing.

In this way, the "outline area" in the claims is a broad concept that includes groups of pixels in contact with the boundary for which the colored ink gradation values change rapidly. Furthermore, "outline area" may also be structured so as to include pixels adjacent to or pixels near the pixels in contact with the boundary for which the colored ink gradation values change rapidly. This is because it is possible for quality-enhancing ink ejected on the nearby pixels to become a cause of blurring as the resolution increases for the printing resolution.

Meanwhile, of the areas formed by multiple pixels for which pixels that form colored dots and pixels that do not form colored dots are adjacent, it is possible to structure this to limit the outline area so that the area is formed by pixels for which colored dots are not formed. With this kind of area, it is easy for easily visible blurring to occur, so by doing this, it is possible to show a marked effect with an easy structure. In specific terms, this kind of structure can effectively suppress blurring which occurs easily with line image and text printing.

With the working example noted above, it is possible to replace part of the structure realized with hardware by using software, and conversely, it is also possible to replace part of the structure realized with software by using hardware. For example, it is possible to have part or all of the functions of the printer driver 96 shown in FIG. 1 executed by a control circuit 40 in the printer 20. In this case, part or all of the functions of the computer 90 as the printing control device that creates printing data is realized by the control circuit 40 of the printer 20.

When part or all of the functions of the present invention are realized using software, that software (computer program) can be provided in a form stored on a computer readable recording medium. With this invention, a "computer readable recording medium" is not limited to a portable type recording medium such as a flexible disk or CD-ROM, but also includes internal storage devices in a computer such as various types of RAM or ROM, etc., as well as external storage devices fixed to a computer such as a hard disk, etc.

Finally, a Japanese patent application (Patent Application No. 2003-324377 (application date: Sep. 17, 2003)) which is the basis for the priority claim of this application is included in the disclosure as a reference.

What is claimed is:

1. A printing control method of generating print data to be supplied to a print unit to print, the print unit capable of forming dots on a print medium by ejecting at least one type of colored ink containing a color material and a quality-enhancing ink for enhancing quality of a printed material, the printing control method comprising:

(a) an outline area extraction step of extracting an outline area of an image expressed by given image data; and (b) a dot data generating step of generating colored dot data and transparent dot data according to the image data, the colored dot data expressing formation status of colored dots formed with the colored ink on each pixel, the transparent dot data expressing formation status of transparent dots formed with the quality-enhancing ink on each pixel, wherein the dot data generating step includes an ink volume reduction step of reducing ink volume of the transparent dots formed in the outline area among the transparent dots, the ink volume reduction step including a step of reducing a gradation value of the quality-enhancing ink for the pixels belonging to the outline area, and the dot data generating step further includes a color conversion step of converting color specification system of the image data, to convert pixel value expressing color of each pixel to multiple gradation data of the quality-enhancing ink and multiple gradation data of each color for expressing the color of each pixel with inks available in the print unit.

2. The printing control method in accordance with claim 1, wherein the dot data generating step comprises:

a gradation-reduction step of generating colored dot data and transparent dot data according to the multiple gradation data, the colored dot data expressing formation status of colored dots formed with the colored ink on each pixel, the transparent dot data expressing formation status of transparent dots formed with the quality-enhancing ink on each pixel, wherein the ink volume reduction step includes a step of making size of the dots formed on the pixels belonging to the outline area smaller.

3. The printing control method in accordance with claim 1, wherein the outline area extraction step includes a step of calculating total value of the gradation values for the colored ink of each pixel according to the multiple gradation data, and also extracting the outline area based on the calculated total value.

4. The printing control method in accordance with claim 1, wherein the color conversion step includes a step of generating multiple gradation data of the colored ink and multiple gradation data of the quality-enhancing ink as multiple same bit binary data, wherein the outline area extraction step includes a step of using a part of bits of the multiple gradation data of the quality-enhancing ink as storage for a flag for showing whether the extracted outline part or not, wherein the dot data generating step includes a step of reducing the ink volume for pixels belonging to the outline part according to the flag.

5. The printing control method in accordance with claim 1, wherein the outline area is an area comprised of a plurality of pixels for which the colored dots are unformed, within an area comprised of multiple pixels including pixels for which colored dots are formed and the pixels for which the colored dots are unformed, side by side.

6. A printing method of printing by ejecting inks to form dots on a printing medium, the printing method comprising the steps of:

(a) providing a print unit capable of forming dots on a print medium by ejecting at least one type of colored ink containing a color material and a quality-enhancing ink for enhancing quality of a printed material;

(b) extracting an outline area of an image expressed by given image data, and (c) generating colored dot data and transparent dot data according to the image data, the colored dot data expressing formation status of colored dots formed with the colored ink on each pixel, the transparent dot data expressing formation status of transparent dots formed with the quality-enhancing ink on each pixel, wherein the step (c) includes a step of reducing ink volume of the transparent dots formed in the outline area among the transparent dots, the step of reducing ink volume including a step of reducing a gradation value of the quality-enhancing ink for the pixels belonging to the outline area, and the step (c) further includes a color conversion step of converting color specification system of the image data, to convert pixel value expressing color of each pixel to multiple gradation data of the quality-enhancing ink and multiple gradation data of each color for expressing the color of each pixel with inks available in the print unit.

7. A printing control apparatus for generating print data to be supplied to a print unit to print, the print unit capable of forming dots on a print medium by ejecting at least one type of colored ink containing a color material and a quality-enhancing ink for enhancing quality of a printed material, the printing control apparatus comprising:

an outline area extractor configured to extract an outline area of an image expressed by given image data; and a dot data generator configured to generate colored dot data and transparent dot data according to the image data, the colored dot data expressing formation status of colored dots formed with the colored ink on each pixel, the transparent dot data expressing formation status of transparent dots formed with the quality-enhancing ink on each pixel, wherein the dot data generator is configured to reduce ink volume of the transparent dots formed in the outline area among the transparent dots, the reducing of the ink volume including reducing a gradation value of the quality-enhancing ink for the pixels belonging to the outline area, and the dot data generator is further configured to convert color specification system of the image data, to convert pixel value expressing color of each pixel to multiple gradation data of the quality-enhancing ink and multiple gradation data of each color for expressing the color of each pixel with inks available in the print unit.

8. A printing apparatus for printing by forming dots on a printing medium, the printing apparatus comprising:

a print unit capable of forming dots on a print medium by ejecting at least one type of colored ink containing a color material and a quality-enhancing ink for enhancing quality of a printed material;

an outline area extractor configured to extract an outline area of an image expressed by given image data; and a dot data generator configured to generate colored dot data and transparent dot data according to the image data, the colored dot data expressing formation status of colored dots formed with the colored ink on each pixel, the transparent dot data expressing formation status of transparent dots formed with the quality-enhancing ink on each pixel, wherein the dot data generator is configured to reduce ink volume of the transparent dots formed in the outline area among the transparent dots, the reducing of the ink volume including reducing a gradation value of the quality-enhancing ink for the pixels belonging to the outline area, and the dot data generator is further configured to convert color specification system of the image data, to convert pixel value expressing color of each pixel to multiple gradation data of the quality-enhancing ink and multiple gradation data of each color for expressing the color of each pixel with inks available in the print unit.

9. A computer program product for causing a computer to generate print data to be supplied to a print unit to print, the print unit capable of forming dots on a print medium by ejecting at least one type of colored ink containing a color material and a quality-enhancing ink for enhancing quality of a printed material, the computer program product comprising:

a computer readable medium; and a computer program stored on the computer readable medium, the computer program comprising:

a first program for causing the computer to extract an outline area of an image expressed by given image data; and a second program for causing the computer to generate colored dot data and transparent dot data according to the image data, the colored dot data expressing formation status of colored dots formed with the colored ink on each pixel, the transparent dot data expressing formation status of transparent dots formed with the quality-enhancing ink on each pixel, wherein the second program includes a program for causing the computer to reduce ink volume of the transparent dots formed in the outline area among the transparent dots, the reducing of the ink volume including reducing a gradation value of the quality-enhancing ink for the pixels belonging to the outline area, and the second program further includes a program for causing the computer to convert color specification system of the image data, to convert pixel value expressing color of each pixel to multiple gradation data of the quality-enhancing ink and multiple gradation data of each color for expressing the color of each pixel with inks available in the print unit.

* * * * *